(12) United States Patent
Voelker et al.

(10) Patent No.: US 10,766,465 B2
(45) Date of Patent: *Sep. 8, 2020

(54) WHEEL AND LUG NUT CLEANING DEVICE

(71) Applicant: Black Tie Brands, LLC, Miami, FL (US)

(72) Inventors: Scott Voelker, Miami, FL (US); Jonathan Batchelor, Miami, FL (US)

(73) Assignee: Black Tie Brands, LLC, Miami, FL (US)

( * ) Notice: Subject to any disclaimer, the term of this patent is extended or adjusted under 35 U.S.C. 154(b) by 238 days.

This patent is subject to a terminal disclaimer.

(21) Appl. No.: 16/035,546

(22) Filed: Jul. 13, 2018

(65) Prior Publication Data

US 2018/0334145 A1 Nov. 22, 2018

Related U.S. Application Data

(63) Continuation of application No. 15/230,177, filed on Aug. 5, 2016, now Pat. No. 10,029,655.

(51) Int. Cl.

| | |
|---|---|
| *B60S 3/04* | (2006.01) |
| *A46B 5/00* | (2006.01) |
| *B08B 9/00* | (2006.01) |
| *B08B 1/00* | (2006.01) |
| *A46D 1/00* | (2006.01) |

(52) U.S. Cl.
CPC ............... *B60S 3/042* (2013.01); *A46B 5/00* (2013.01); *A46D 1/006* (2013.01); *B08B 1/00* (2013.01); *B08B 1/002* (2013.01); *B08B 1/006* (2013.01); *B08B 9/00* (2013.01); *A46B 2200/3046* (2013.01); *A46B 2200/3073* (2013.01); *B60S 3/041* (2013.01); *B60S 3/045* (2013.01)

(58) Field of Classification Search
CPC ... A46B 2200/3046; A46B 3/16; B60S 3/045; B60S 3/042
See application file for complete search history.

(56) References Cited

U.S. PATENT DOCUMENTS

| | | | | |
|---|---|---|---|---|
| 3,693,128 A | * | 9/1972 | Jacobs, Jr. | ............. H01H 85/47 337/166 |
| 4,117,566 A | | 10/1978 | Ward | |
| 5,123,763 A | * | 6/1992 | Simmons | ................ A47L 25/00 15/104.04 |
| 5,806,128 A | | 9/1998 | Love | |

(Continued)

*Primary Examiner* — Michael D Jennings
(74) *Attorney, Agent, or Firm* — Mark C. Johnson; Johnson Dalal (57) ABSTRACT

A wheel and lug nut cleaning device that includes a static central spine defining a front portion and a rear portion, a shape-retaining core encircling the front and rear portions, and a sheath removably coupled to and encircling the core spanning from the rear portion of the static central spine to the distal end of the static central spine, wherein the sheath has a plurality of spaced-part microfiber flanges continuously spanning from the rear portion of the static central spine to the distal end of the static central spine and each extending in a direction outwardly away from an outer surface of the sheath and the core and having a rounded external end, wherein the spine, core and sheath are operably configured to bend in a position to dispose and orient the front portion in a shape-retaining angle relative to the rear portion.

18 Claims, 5 Drawing Sheets

(56) References Cited

U.S. PATENT DOCUMENTS

| | | | |
|---|---|---|---|
| 6,473,930 B1* | 11/2002 | Ortega | A47L 17/00 |
| | | | 15/118 |
| 6,754,932 B2 | 6/2004 | Buzard | |
| 7,356,867 B1 | 4/2008 | Beiermann | |
| 7,631,385 B2 | 12/2009 | Schouten | |
| 8,365,338 B1* | 2/2013 | Figaro | A46B 5/0091 |
| | | | 15/160 |
| 9,283,595 B1* | 3/2016 | Cooper | B08B 1/002 |
| 10,029,655 B1* | 7/2018 | Voelker | A46D 1/006 |
| 2004/0040113 A1* | 3/2004 | Buzard | B60S 3/042 |
| | | | 15/244.1 |
| 2008/0104779 A1* | 5/2008 | Schouten | A46B 13/02 |
| | | | 15/21.1 |

* cited by examiner

WHEEL AND LUG NUT CLEANING DEVICE

CROSS-REFERENCE TO RELATED APPLICATION

This application is a continuation application of and claims priority to pending U.S. Nonprovisional Patent Application No. 15/230,177, filed Aug. 5, 2016, the entirety of which is incorporated by reference.

FIELD OF THE INVENTION

The present invention relates generally to wheel and lug nut cleaning devices and, more particularly, to an integrated wheel and lug nut cleaning devices.

BACKGROUND OF THE INVENTION

Various types of vehicle wheel cleaning tools and vehicle lug nut cleaning tools are known in the prior art. Many of such known tools clean only the wheel or the lug nut, thereby requiring more than one device to clean both. In addition, such tools include an elongated handle, which does not permit sufficient force to vigorously and thoroughly clean the wheel and lug nuts. Further, some of the wheel and lug nut cleaning tools are motorized with a motor that does not have enough power for thorough cleaning, requires regular replacement of batteries, or requires an extension cord to plug the tools into an electric power source. Even still, several of the known wheel and lug nut cleaning tools do not provide a brush that is removable or removable and washable.

However, what is needed, and what the present wheel and lug nut cleaning device provides, is a single wheel and lug nut cleaning device to clean an outer side of a wheel rim and an inner wheel rim behind and between the wheel spokes, where road grime and dirty brake dust tends to collect, as well as each lug nut itself and any and all rim cavities around the lug nuts, where road grime and brake dust additionally tends to collect. The instant device eliminates exposed metal parts in order to prevent scratching of and damage to the rim surface paint and the clear coat over the vehicle's paint in contrast to known wheel cleaning devices which have metal in a handle thereof to hold the bristles in place which, in turn, can rub against, scratch, and otherwise damage the rim and the paint on the vehicle. The present device further accommodates the cleaning of wheel rims in a wide range of sizes thereby eliminating the need for different tools for cleaning different cars. The shape of the spine is provided to reduce hand, wrist, and arm fatigue while cleaning the wheel rims and lug nuts on a vehicle. The device is formed of anti-microbial materials to reduce the odor and bacterial growth after getting wet when compared to similar known device.

Therefore, a need exists to overcome the problems with the prior art as discussed above.

SUMMARY OF THE INVENTION

The invention provides a wheel and lug nut cleaning device that overcomes the hereinafore-mentioned disadvantages of the heretofore-known devices and methods of this general type and that can bend and be retained in a shape desired by the user to clean vehicle rim and is operable to also clean a lug nut of a vehicle's wheel. With the foregoing and other objects in view, there is provided, in accordance with the invention, a device also includes a static central spine having a distal end, a proximal end opposing the distal end, defining a front portion including the distal end of the static central spine, and defining a rear portion including the proximal end. The device also includes a shape-retaining core encircling the front and rear portions of the static central spine and may be of a non-water absorbent material. The device may also include a sheath removably coupled to and encircling the core spanning from the rear portion of the static central spine to the distal end of the static central spine, wherein the sheath has a plurality of spaced-part microfiber flanges continuously spanning from the rear portion of the static central spine to the distal end of the static central spine and each extending in a direction outwardly away from an outer surface of the sheath and the core and having a rounded external end. The spine, core and sheath are also operably configured to bend in a position to dispose and orient the front portion in a shape-retaining angle relative to the rear portion.

In accordance with another feature, an embodiment of the present invention also includes the sheath having a proximal opening and enclosed pocket defined by thereon, wherein the proximal opening and enclosed pocket spatially coupled to one another and shaped and sized to receive the shape-retaining core and spine.

In accordance with a further feature of the present invention, the plurality of spaced-part microfiber flanges are disposed in a tightly spaced configuration. The plurality of spaced-part microfiber flanges may also be of semi obround shape.

In accordance with yet another feature, an embodiment of the present invention also includes the sheath also having a tip disposed at a terminal end, wherein the plurality of spaced-part microfiber flanges continuously span from the rear portion of the static central spine to the tip of the sheath.

In accordance with an additional feature of the present invention, the sheath is gradually tapered to the tip.

In accordance with a further feature, an embodiment of the present invention also includes a lug nut and rim cavity-cleaning body with a proximal attachment end removably coupled to the proximal end of the rear portion of the spine, the lug nut and rim cavity-cleaning body having a central base having a plurality of spaced-apart substantially parallelpiped flexible cleaning flanges radially disposed on the central base and a gap disposed between each of the cleaning flanges, each of the cleaning flanges having an internal side attached to the central base.

In accordance with an additional feature, an embodiment of the present invention also includes a cover with a plurality of extensions each having sidewalls defining channels with one of the plurality of spaced-apart substantially parallelpiped flexible cleaning flanges disposed therein, wherein the sidewalls are configured to engage and conform to the one of the plurality of spaced-apart substantially parallelpiped flexible cleaning flanges.

In accordance with an additional feature of the present invention, the central base is substantially disc-shaped and includes the proximal attachment end removably coupled to the proximal end of the rear portion of the spine through a male-female attachment configuration.

In accordance with yet another feature, an embodiment of the present invention also includes a receiver aperture defined on the proximal end of the rear portion of the spine, wherein a male member, including the proximal attachment end, protruding from a bottom surface of the central base is disposed within the receiver aperture.

In accordance with an additional feature of the present invention, the shape-retaining angle relative to the rear portion ranges from approximately 10 degrees to 45 degrees.

In accordance with the present invention, a wheel and lug nut cleaning device is also disclosed that includes a static central spine having a distal end, a proximal end opposing the distal end, defining a front portion including the distal end of the static central spine, and defining a rear portion including the proximal end, a shape-retaining core encircling the front and rear portions of the static central spine, a sheath, and a lug nut and rim cavity-cleaning body. The sheath may be removably coupled to and encircling the core spanning from the rear portion of the static central spine to the distal end of the static central spine, the sheath having a plurality of spaced-part microfiber flanges continuously spanning from the rear portion of the static central spine to the distal end of the static central spine and each extending in a direction outwardly away from an outer surface of the sheath and the core and having a rounded external end, wherein the spine, core and sheath are operably configured to bend in a position to dispose and orient the front portion in a shape-retaining angle relative to the rear portion. The lug nut and rim cavity-cleaning body has a proximal attachment end removably coupled to the proximal end of the rear portion of the spine, the lug nut and rim cavity-cleaning body having a central base having a plurality of spaced-apart substantially parallelpiped flexible cleaning flanges radially disposed on the central base and a gap disposed between each of the cleaning flanges, each of the cleaning flanges having an internal side attached to the central base.

Although the invention is illustrated and described herein as embodied in a wheel and lug nut cleaning device, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the cleaning device spanning from the proximal end to the distal end of the device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

With reference now to the drawings, and in particular FIGS. 1-5 thereof, an example of the instant wheel and lug nut cleaning device employing the principles and concepts of the present wheel and lug nut cleaning device and generally designated by the reference number 10 will be described.

Referring to FIGS. 1-5, the present wheel and lug nut cleaning device 10 is illustrated. The wheel and lug nut cleaning device 10 includes a static central spine 20. The spine 20 has an exterior end 22 (also referred to as a distal end 22), an opposing interior end 24 (also referred to as a proximal end 24), a spine length separating the distal and proximal ends 22, 24, a front portion 26 disposed along the spine length and proximal the exterior end 22, and a rear portion 28 continuously disposed between the front portion 26 and the interior end 24. Said another way, the rear portion 28 of the spine 20 includes the proximal end 24 and spans from the proximal end 24 up to the beginning of the front portion 26. The rear portion 28 may be disposed in a single plane. The front portion 26 is operable to be disposed at an angle in a range of 10 degrees to 45 degrees relative the plane of the rear portion 28. The spine 20 is formed of a material selected from either a metallic substance or a plastic-containing material.

Figure 3:
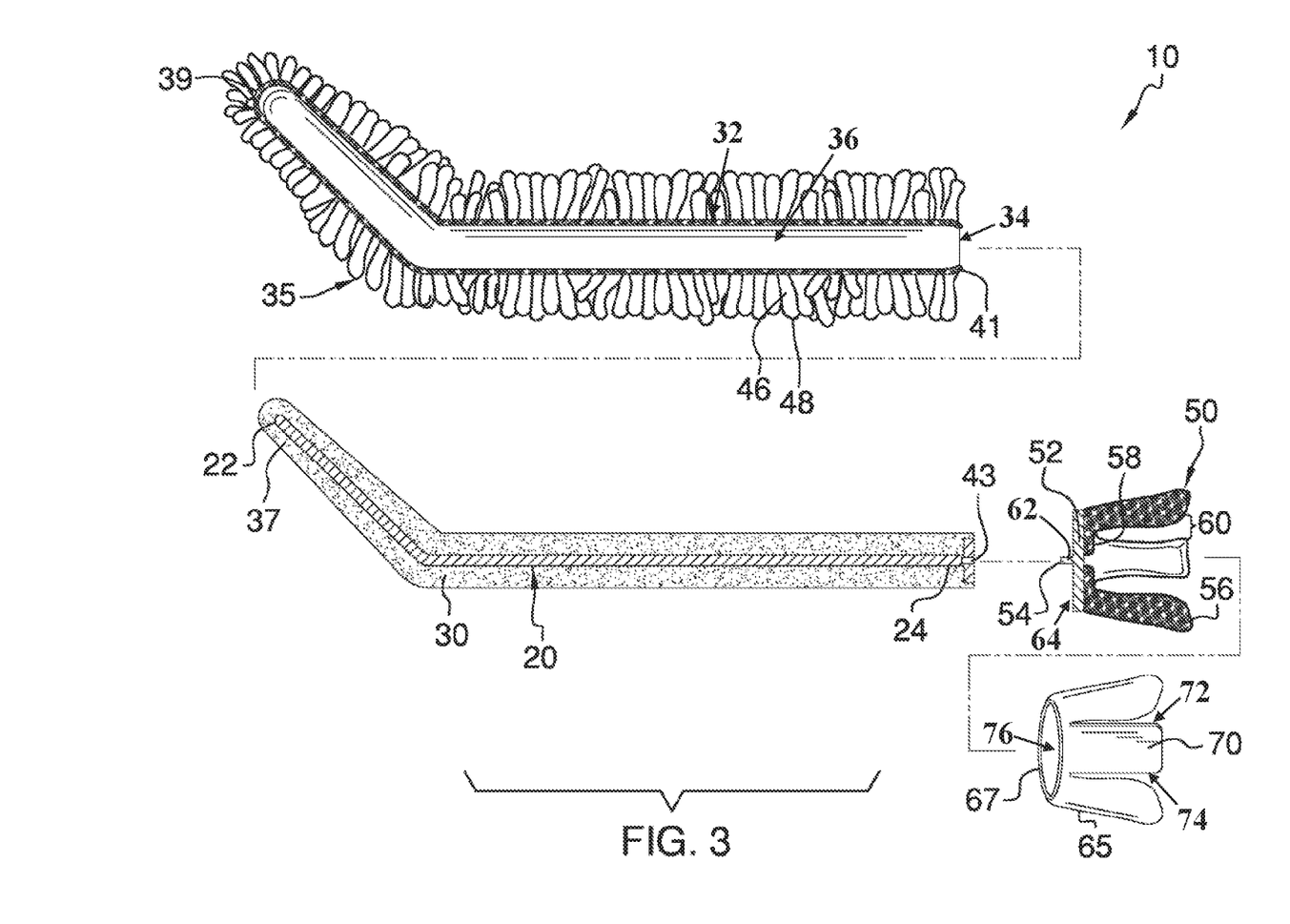
FIG. 3 is a cross-sectional view taken along line 3-3 of FIG. 2 with removable cover for a lug nut and rim cavity cleaning body exploded therefrom.

A shape-retaining non-abrasive core 30 encircles the front end, the front portion and the rear portion of the spine. The core 30 is impervious to petroleum and is non-water absorbent as well as being non-biodegradable. A sheath 35 removably encompasses and substantially conforms to the core 30. More specifically, the sheath 35 may include a proximal opening 34 and enclosed pocket 36 defined by thereon. As best seen in FIG. 3, the proximal opening 34 and enclosed pocket 36 are spatially coupled to one another and shaped and sized to receive the shape-retaining core 30 and spine 20. When the sheath 35 is coupled with the core 30 and spine 20, the front portion 26 and the rear portion 28 (best shown in FIG. 1) would include all three components.

Figure 1:
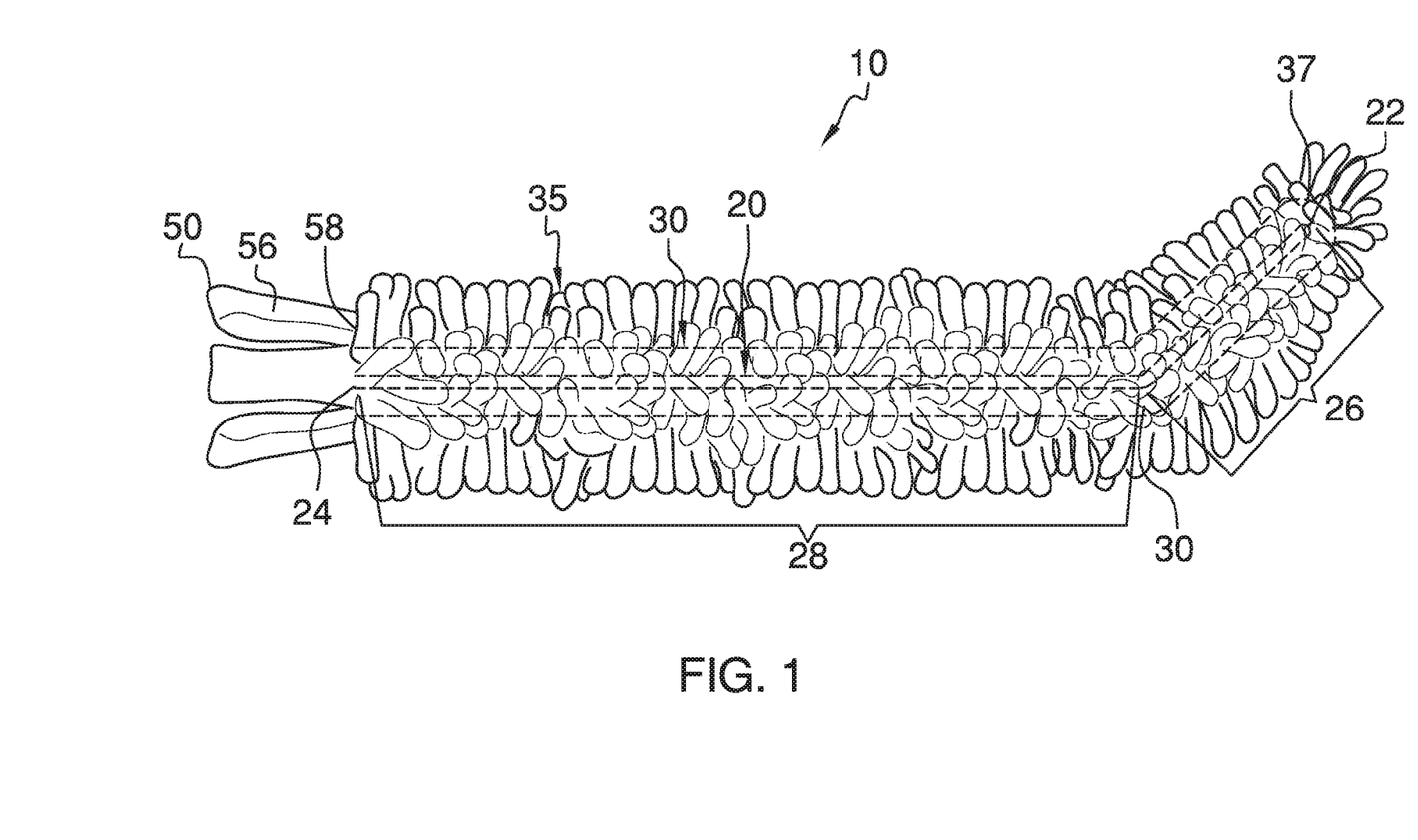
FIG. 1 is a side elevation view.
Figure 2:
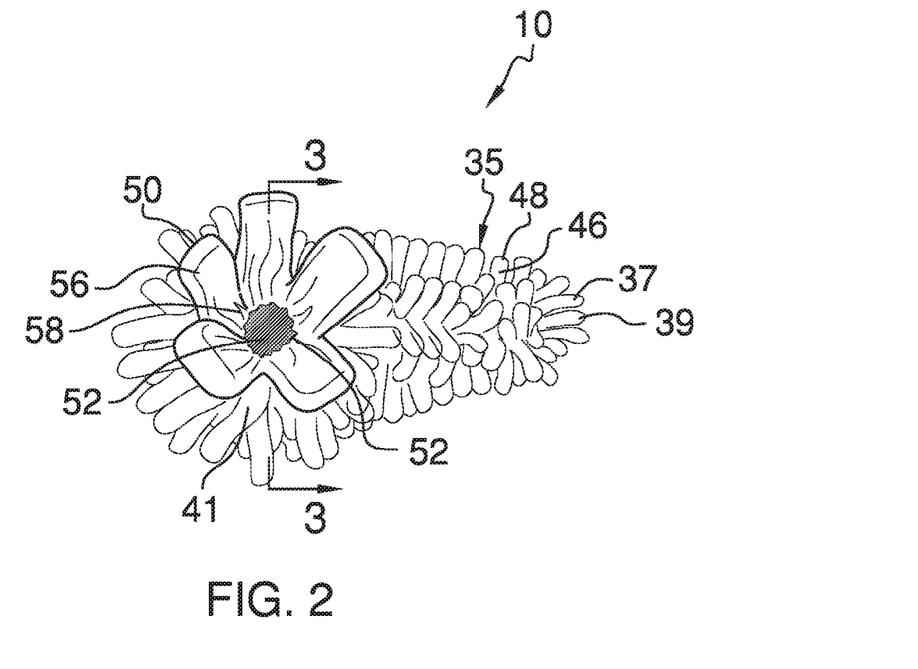
FIG. 2 is a bottom plan view.

The sheath 35 and/or core 30 may have a gradually tapered wheel spoke and wheel rim-cleaning forward end 37 which diminishes in diameter toward a tip 39 thereof, a rearward end 41, a central opening 34 defined at the rearward end 41, and a plurality of spaced-apart semi-obround microfiber flanges 46. As best seen in FIGS. 2-3, the microfiber flanges 46 may also be considered disposed in a tightly spaced configuration. The microfiber flanges 46 continuously extend outwardly from the core 30 away from spine 20 from the tip 39 to proximal the rearward end 41. Each of the microfiber flanges 46 may have a rounded external end 48. The microfiber flanges 46 may be formed of chenille microfiber. As best seen in FIGS. 1-3, when the spine 20, core 30, and sheath 35 are coupled together, the plurality of spaced-part microfiber flanges 46 continuously span from the rear portion 28 of the static central spine 20 to the distal end 22 of the static central spine 20 and each extend in a direction outwardly away from an outer surface 32 of the sheath 35 and the core 30. The flanges 46 may also extend to the tip 39 as discussed above and shown in the figures.

Still referring to FIGS. 1-3, a lug nut and rim cavity-cleaning body 50 is removably couplable and/or coupled/disposed on the interior end 24 of the spine 20. The lug nut and rim cavity-cleaning body 50 may have a substantially disc-shaped central base 52, which has a proximal attachment end 54 and a male member 62 engageable and removably couplable to the end 24 of the spine 20. Said another way, the proximal attachment end 54 of the central base 52 is removably coupled to the proximal end 24 of the rear portion 28 of the spine 20 through a male-female attachment configuration (best seen in FIG. 3). Further, a receiver aperture 43 is defined on the proximal end 24 of the rear portion 28 of the spine 20. The male member 62, which includes the proximal attachment end 54, can be seen protruding from a bottom surface 64 of the central base 52 and is operable to be disposed within the receiver aperture 43. The lug nut and rim cavity-cleaning body 50 also includes a plurality of spaced apart substantially parallelepiped flexible cleaning flanges 56 radially disposed on the central base 52. A gap 60 is disposed between each of the cleaning flanges 56. Each of the cleaning flanges 56 has an internal side 58 attached to the central base 52.

Figure 4:
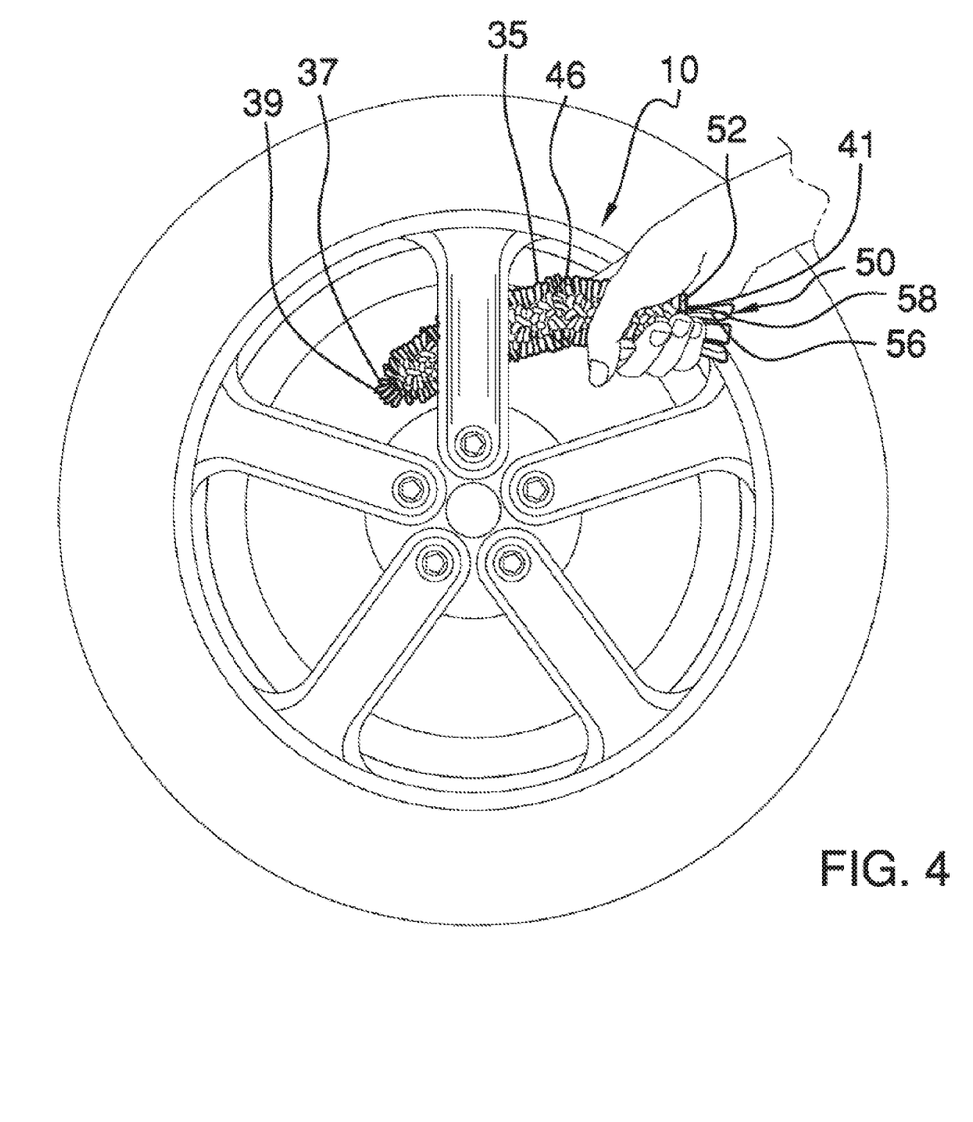
FIG. 4 is an in-use view illustrating use for cleaning a wheel spoke.
Figure 5:
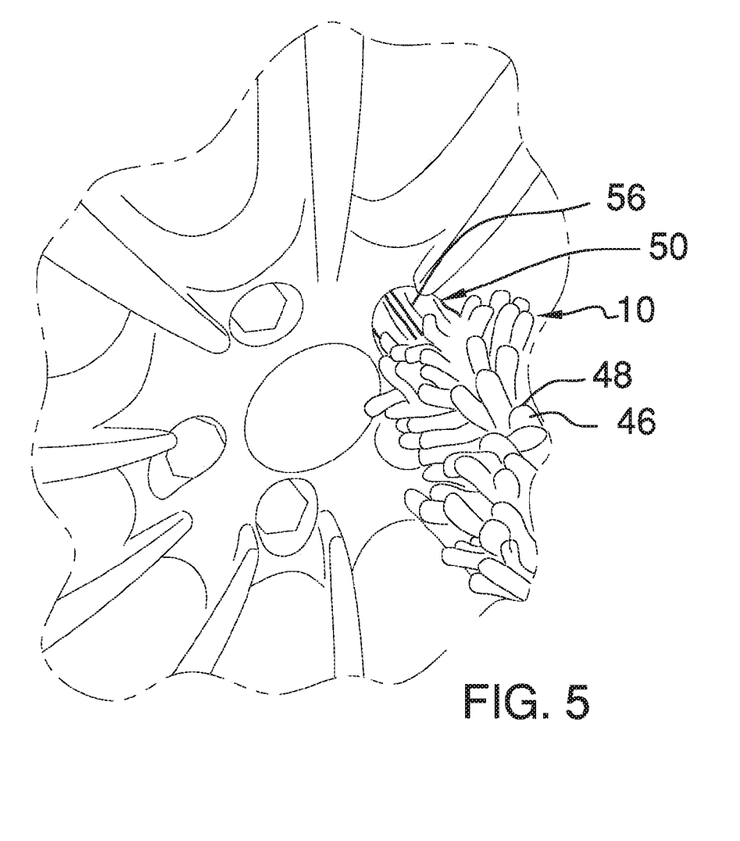
FIG. 5 is an in-use view illustrating use for cleaning a lug nut.

With reference to FIGS. 1 and 3-4, the spine 20, shape-retaining core 30, and sheath 35 are operably configured to bend in a position to dispose and orient the front portion 26 in a shape-retaining angle relative to the rear portion 28. Said another way, as discussed above, an application of force may be used to bend the front portion 26 at the desired angle, wherein when said force is removed, the shape is retained of the front portion, i.e., it is shape-retaining.

A cover 65 is removably disposed on the lug nut and rim cavity-cleaning body 50. The cover 65 includes a central ring 67 and plurality of extensions 70 radially disposed on the central ring 67. The extensions 70 are configured to engage and conform to the cleaning flanges 56. More specifically, to removably dispose the cover 65 on the lug nut and rim cavity-cleaning body 50, each of the plurality of extensions 70 have sidewalls, e.g., sidewalls 72, 74, defining a channel, e.g., channel 76, with one of the plurality of spaced-apart substantially parallelpiped flexible cleaning flanges 56 disposed therein. Again, the sidewalls 72, 74 of the cover 70 are configured to engage and conform to said cleaning flange 56 disposed therein. The core 30 is formed of or has properties similar to dense viscoelastic foam having a weight per cubic foot, a density in a range per cubic foot, an indentation force deflection, a resilience, and a hardness measured by pressure applied to the foam in order to accommodate fusion with the spine along with non-abrasive thorough cleaning of the rim, rim cavities, and lug nut surfaces.

What is claimed is:

1. A wheel and lug nut cleaning device comprising:
    a static central spine having a distal end, a proximal end opposing the distal end, defining a front portion including the distal end of the static central spine, and defining a rear portion including the proximal end;
    a shape-retaining core encircling the front and rear portions of the static central spine and of a non-water absorbent material; and
    a sheath removably coupled to and encircling the core spanning from the rear portion of the static central spine to the distal end of the static central spine, the sheath having a plurality of spaced-part microfiber flanges continuously spanning from the rear portion of the static central spine to the distal end of the static central spine and each extending in a direction outwardly away from an outer surface of the sheath and the core and having a rounded external end, wherein the spine, core and sheath are operably configured to bend in a position to dispose and orient the front portion in a shape-retaining angle relative to the rear portion.

2. The wheel and lug nut cleaning device according to claim 1, wherein the sheath further comprises:
    a proximal opening and enclosed pocket defined by thereon, the proximal opening and enclosed pocket spatially coupled to one another and shaped and sized to receive the shape-retaining core and spine.

3. The wheel and lug nut cleaning device according to claim 1, wherein:
    the plurality of spaced-part microfiber flanges are disposed in a tightly spaced configuration.

4. The wheel and lug nut cleaning device according to claim 1, wherein:
    each of the plurality of spaced-part microfiber flanges of semi obround shape.

5. The wheel and lug nut cleaning device according to claim 1, wherein the sheath further comprises:
    a tip disposed at a terminal end, wherein the plurality of spaced-part microfiber flanges continuously span from the rear portion of the static central spine to the tip of the sheath.

6. The wheel and lug nut cleaning device according to claim 1, wherein:
    the sheath is gradually tapered to the tip.

7. The wheel and lug nut cleaning device according to claim 1, further comprising:
a lug nut and rim cavity-cleaning body removably coupled to the rear portion of the spine, the lug nut and rim cavity-cleaning body having a central base having a plurality of spaced-apart substantially parallelpiped flexible cleaning flanges radially disposed on the central base and a gap disposed between each of the cleaning flanges, each of the cleaning flanges having an internal side attached to the central base.

8. The wheel and lug nut cleaning device according to claim 7, further comprising:
a cover with a plurality of extensions each having sidewalls defining channels with one of the plurality of spaced-apart substantially parallelpiped flexible cleaning flanges disposed therein, the sidewalls configured to engage and conform to the one of the plurality of spaced-apart substantially parallelpiped flexible cleaning flanges.

9. The wheel and lug nut cleaning device according to claim 7, wherein:
the central base is substantially disc-shaped and includes a proximal attachment end removably coupled to the proximal end of the rear portion of the spine through a male-female attachment configuration.

10. The wheel and lug nut cleaning device according to claim 9, further comprising:
a receiver aperture defined on the proximal end of the rear portion of the spine, wherein a male member, including the proximal attachment end, protruding from a bottom surface of the central base is disposed within the receiver aperture.

11. The wheel and lug nut cleaning device according to claim 10, wherein:
the shape-retaining angle relative to the rear portion ranges from approximately 10 degrees to 45 degrees.

12. The wheel and lug nut cleaning device according to claim 1, wherein:
the plurality of spaced-part microfiber flanges are disposed in a tightly spaced configuration.

13. The wheel and lug nut cleaning device according to claim 12, wherein:
each of the plurality of spaced-part microfiber flanges of semi obround shape.

14. A wheel and lug nut cleaning device comprising:
a static central spine having a distal end, a proximal end opposing the distal end, defining a front portion including the distal end of the static central spine, and defining a rear portion including the proximal end;
a shape-retaining core encircling the front and rear portions of the static central spine;
a sheath removably coupled to and encircling the core spanning from the rear portion of the static central spine to the distal end of the static central spine, the sheath having a plurality of spaced-part microfiber flanges continuously spanning from the rear portion of the static central spine to the distal end of the static central spine and each extending in a direction outwardly away from an outer surface of the sheath and the core and having a rounded external end, wherein the spine, core and sheath are operably configured to bend in a position to dispose and orient the front portion in a shape-retaining angle relative to the rear portion; and
a lug nut and rim cavity-cleaning body with a proximal attachment end removably coupled to the proximal end of the rear portion of the spine, the lug nut and rim cavity-cleaning body having a central base having a plurality of spaced-apart substantially parallelpiped flexible cleaning flanges radially disposed on the central base and a gap disposed between each of the cleaning flanges, each of the cleaning flanges having an internal side attached to the central base.

15. The wheel and lug nut cleaning device according to claim 14, wherein:
the shape-retaining core is of a non-water absorbent material.

16. The wheel and lug nut cleaning device according to claim 14, further comprising:
a cover with a plurality of extensions each having sidewalls defining channels with one of the plurality of spaced-apart substantially parallelpiped flexible cleaning flanges disposed therein, the sidewalls configured to engage and conform to the one of the plurality of spaced-apart substantially parallelpiped flexible cleaning flanges.

17. The wheel and lug nut cleaning device according to claim 16, wherein:
the central base is substantially disc-shaped and includes the proximal attachment end removably coupled to the proximal end of the rear portion of the spine through a male-female attachment configuration.

18. The wheel and lug nut cleaning device according to claim 17, further comprising:
a receiver aperture defined on the proximal end of the rear portion of the spine, wherein a male member, including the proximal attachment end, protruding from a bottom surface of the central base is disposed within the receiver aperture.

\* \* \* \* \*